United States Patent
Malik et al.

(10) Patent No.: US 12,423,275 B2
(45) Date of Patent: Sep. 23, 2025

(54) DATABASE METADATA UPDATE VALIDATION

(71) Applicant: SAP SE, Walldorf (DE)

(72) Inventors: Akarsh Malik, Bengaluru (IN); Sohandeep Das, Bengaluru (IN); Arpitha A Shetty, Kannada (IN); Veekshitha Naveenachandra, Mangalore (IN); Devicharan Vinnakota, Bangalore (IN)

(73) Assignee: SAP SE, Walldorf (DE)

(*) Notice: Subject to any disclaimer, the term of this patent is extended or adjusted under 35 U.S.C. 154(b) by 239 days.

(21) Appl. No.: 18/050,386

(22) Filed: Oct. 27, 2022

(65) Prior Publication Data

US 2024/0152491 A1 May 9, 2024

(51) Int. Cl.
| | |
|---|---|
| *G06F 16/00* | (2019.01) |
| *G06F 16/21* | (2019.01) |
| *G06F 16/22* | (2019.01) |
| *G06F 16/242* | (2019.01) |
| *G06F 16/2455* | (2019.01) |

(52) U.S. Cl.
CPC ........ *G06F 16/212* (2019.01); *G06F 16/2282* (2019.01); *G06F 16/2423* (2019.01); *G06F 16/2456* (2019.01)

(58) Field of Classification Search
CPC .............. G06F 16/212; G06F 16/2282; G06F 16/2423; G06F 16/2456
See application file for complete search history.

(56) References Cited

U.S. PATENT DOCUMENTS

| | | | |
|---|---|---|---|
| 2016/0125026 A1* | 5/2016 | Nguyen | G06F 16/2455 707/713 |
| 2024/0004932 A1* | 1/2024 | BenHarush | G06F 16/242 |

* cited by examiner

*Primary Examiner* — Paul Kim
(74) *Attorney, Agent, or Firm* — Fountainhead Law Group, PC

(57) ABSTRACT

A user interface may include one or more visualizations based on queries to a database using query model metadata. Updated metadata of columns of the database may be obtained which may be different from the query model metadata. A set of used columns and a set of unused columns may be determined based on the query model. One or more metadata mismatches may be determined based on a comparison of the query model metadata for the set of used columns and the updated metadata for the set of used columns. The one or more metadata mismatches may be presented in a user interface configured to enable a user to rectify each. One or more selections from the user may be obtained to rectify at least one of the one or more metadata mismatches. The corresponding columns may be deleted or replaced based on the one or more selections.

20 Claims, 15 Drawing Sheets

DATABASE METADATA UPDATE VALIDATION

BACKGROUND

The present disclosure pertains to database systems and in particular to metadata updates and validation and rectification of a query model.

Various applications, such as a dashboard visualization applications, can query a database using a query model to access information. The query model may reflect the metadata of the database and be used when querying the database. However, database artifacts are prone to change over a period of time due. For instance, a column can be added, renamed, or deleted. Such changes can cause a mismatch between the database metadata and the metadata of the query model, causing queries to fail. For dashboard visualization applications, failed queries may affect the visualizations that are using the database artifacts having the changed metadata. In some cases the visualizations may not work as expected. It may be cumbersome for the end-user to check what went wrong with the queries.

The present disclosure addresses these issue and others, as further described below.

DETAILED DESCRIPTION

Figure 1:
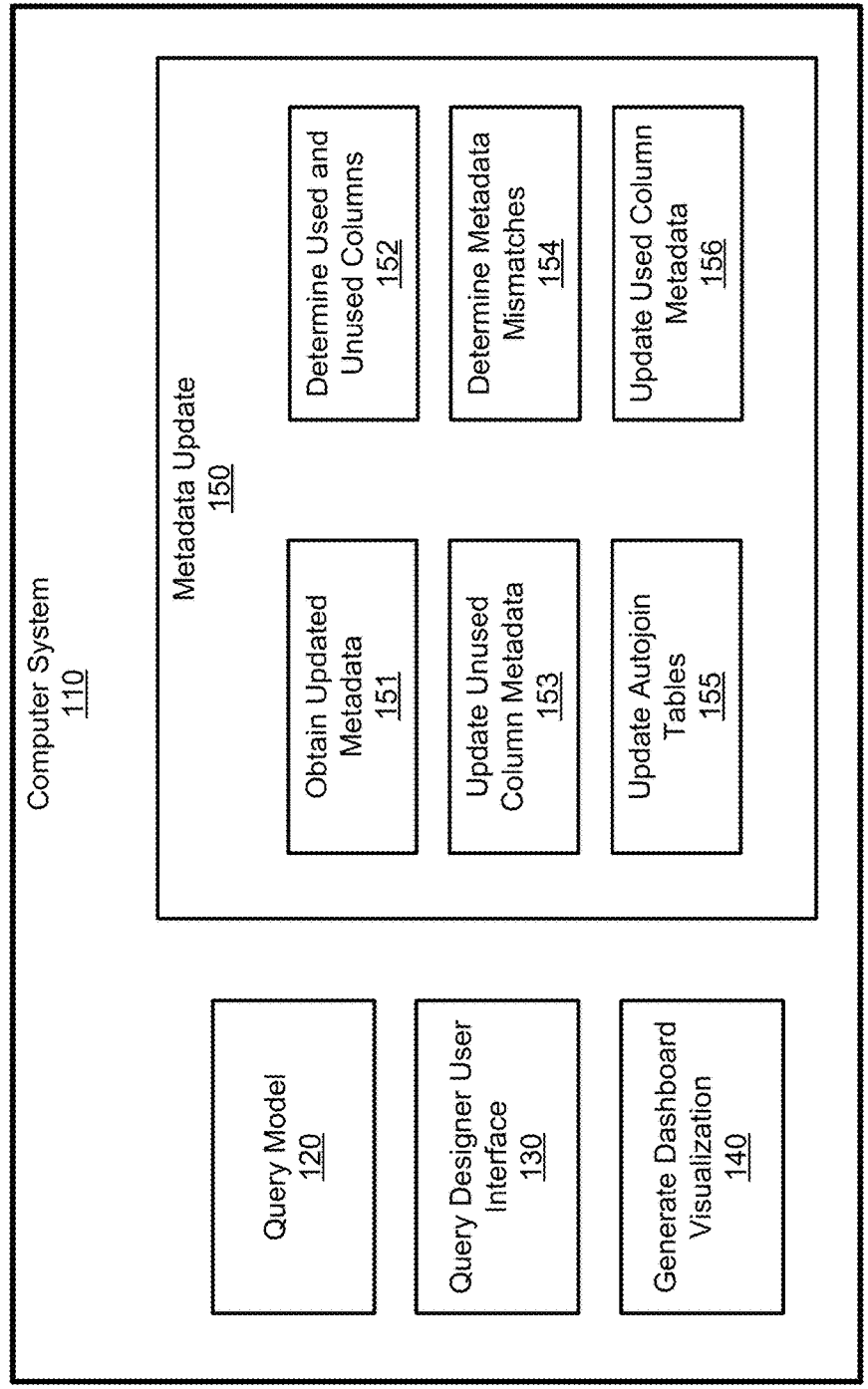
FIG. 1 shows a diagram of a computer system for performing metadata update, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, various applications, such as a dashboard visualization applications, can query a database using a query model to access information. The query model may reflect the metadata of the database and be used when querying the database. However, database artifacts are prone to change over a period of time due. For instance, a column can be added, renamed, or deleted. Such changes can cause a mismatch between the database metadata and the metadata of the query model, causing queries to fail. For dashboard visualization applications, failed queries may affect the visualizations that are using the database artifacts having the changed metadata. In some cases the visualizations may not work as expected. It may be cumbersome for the end-user to check what went wrong with the queries.

This situation may arise in different scenarios. For example, it may occur when dashboards are transported from the development system to the production system if the metadata of the development database is different from the metadata of the production database. In another scenario database artifacts in the production systems may have changed during the releases causing the query to fail. In another scenario an error may caused due to an incorrectly defined database name or type during the design time.

To address these issues and others, the present disclosure provides techniques for performing a metadata update that also provides a tool for the user to validate and rectify metadata mismatches or other errors. Many of the examples below are described with respect to a cloud-based visualization dashboard application. Such an application is just an example implementation and other types of applications may implement the same metadata update and query validation/rectification techniques described herein.

As discussed further below, the story visualizations can have two types of data of the affected database artifacts:

database artifacts which are not used in queries by the application and those which are used by queries in the application. In the case of a visualization dashboard application, the database artifacts may be used in generating the visualizations or not used in generating the visualizations. If metadata of database artifacts used in generating visualizations is updated, this may cause the visualizations to break as the dashboard data, configurations, or settings may not be expecting the changes. In certain prior systems there was no mechanism to resolve such errors in the dashboard and it was difficult to bring the dashboard back to the normal for data visualization.

To resolve the above-mentioned problems and others, a metadata update and validation mechanism for both used and unused metadata in query model is disclosed herein. The metadata update and validation technique may be accessed from the application. For a dashboard visualization application, the metadata update and validation techniques may be used when the user makes a selection in the user interface to "edit data source," for example. The user interface may present a list of available columns to use in designing queries as well as indications of which columns are selected (e.g., used) in the visualizations. The query designer component may be automatically updated with the latest set of metadata that are available (e.g., in an original equipment manufacturer (OEM) database) for the unused metadata. This handling of unused metadata is explained in further detail below.

For the used metadata, (e.g., initiated by performing edit data source from the dashboard or a toolbar) the query designer component is configured to obtain validation information indicating errors on query creation. This validation information and errors may be presented in a toolbar of the query designer component along with an indication of the number of errors and other validation error details. A guided query validation tool may be provided to the user in the user interface for use in rectifying these errors. Thereafter the user can return to the dashboard which may query the database without errors and generate the visualizations corrected. The handling of used metadata is described in further detail below.

An overview of performing a metadata update and query validation and rectification is provided below with respect to FIGS. 1 and 2. This overview is then expanded upon with examples and further details in the following figures.

FIG. 1 shows a diagram 100 of a computer system 110 for performing metadata update, according to an embodiment. The computer system 110 may be a cloud computing platform providing cloud applications including a dashboard visualization application and including a database, for example. The computer system 110 includes a query model component 120, a query designer user interface component 130, a generate dashboard visualization component 140, and a metadata update component 150.

The computer system may store a query model 120 for generating a user interface dashboard including one or more visualizations based on queries to a database having a plurality of columns. The queries may be made using query model metadata of the query model 120. The query model 120 comprises query model metadata that reflects metadata of a database that is queried to obtain data for generating the visualizations for the dashboard, for example. The query model 120 may include metadata on columns of the database that may potentially be used in the visualizations and are selectable by a user when configuring a visualization.

The query designer user interface 130 is a user interface that the user may access in order to configure the queries used for the visualizations. The user may access the query designer user interface by selecting "edit data source" from a visualization dashboard user interface, for example. The query designer user interface 130 may present a list of columns of the database, determined from the query model, that are selectable for use in the visualizations.

The generate dashboard visualization component 140 is configured to generate visualizations to present in the dashboard based on queries made to the database. The queries may be made based on the query model. As discussed herein, if the metadata of the database changes such that the query model metadata no longer matches, then queries made to the database may fail, causing the visualizations to be broken and not display information correctly.

The metadata update component 150 is configured to update the query model metadata to reflect updated database metadata in a way such that the data visualizations are not broken. It does not by automatically updating metadata for columns that are not used by the visualizations and by identifying metadata mismatches for columns that are used by the visualizations. The mismatches are presented to the user in the query designer user interface 130 along with options for validating and rectifying errors. The metadata update component 150 includes an obtain updated metadata component 151, a determine used and unused columns component 152, an update unused column metadata component 153, a determine metadata mismatches component 154, an update used column metadata component 155, and an update autojoin tables component 156.

The obtain updated metadata component 151 may be configured to obtain updated metadata of columns of the database. The updated metadata may be different from the query model metadata such that an update of the query model metadata may be performed.

The determine used and unused columns component 152 may be configured to determine a set of used columns and a set of unused columns based on the query model. The used columns being used in the queries for the one or more visualization of the dashboard and the unused columns not being in the queries.

The update unused column metadata component 153 may be configured to update the metadata for the unused columns of the query model metadata automatically in response to determining the set of unused columns. The updating of metadata for the unused columns may not require selections or input from the user.

The determine metadata mismatches component 154 may be configured to determine one or more metadata mismatches based on a comparison of the query model metadata for the set of used columns and the updated metadata for the set of used columns. Each of the one or more metadata mismatches may correspond to a particular column of a table of the database. These mismatches may be presented in the query designer user interface 130 and validation and rectified by a user.

The determine metadata mismatches component 154 may be further configured to obtain validation information for the used columns (e.g., from an OEM end point) in response to determining the one or more metadata mismatches. The validation information may identify one or more of unavailable fields, data sources, invalid filters, and joins, for example. The determine metadata mismatches component 154 may be further configured to parse the validation information to obtain status and description properties. These status and description properties being presented to the user in the query designer user interface 130.

The query designer user interface 130 may present the one or more metadata mismatches and it may be configured to enable a user to rectify each of the one or more metadata mismatches by deleting the corresponding column or replacing the corresponding column with a replacement column. The query designer user interface 130 may obtain one or more selections from the user to rectify at least one of the one or more metadata mismatches. The one or more selections may indicate deletion or replacement of corresponding columns.

The update used column metadata component 155 may be configured to delete or replace the corresponding columns based on the one or more selections. That is, the update used column metadata component 155 update the query model metadata based on the updated metadata and based on the one or more selections from the user.

After the metadata has been updated, the generate dashboard visualization component 140 may be configured to generate the one or more visualizations based on queries made using the query model that has been updated based on the updated metadata.

Autojoin tables refers to a set of tables that are grouped or merged in the query designer user interface 130. The update autojoin tables component 156 may be configured to identify one or more autojoin tables in the query model metadata. The one or more autojoin tables may be merged in the user interface. The updating of the query model metadata for a particular autojoin table may be performed in response to a user expanding the particular autojoin table in the user interface. That is, the metadata update for autojoin table is not performed automatically but instead uses a "lazy loading" mechanism where the columns are updated on an on-demand basis, thereby avoiding performance issues that may be caused by performing a metadata update for multiple autojoin columns at once.

Figure 2:
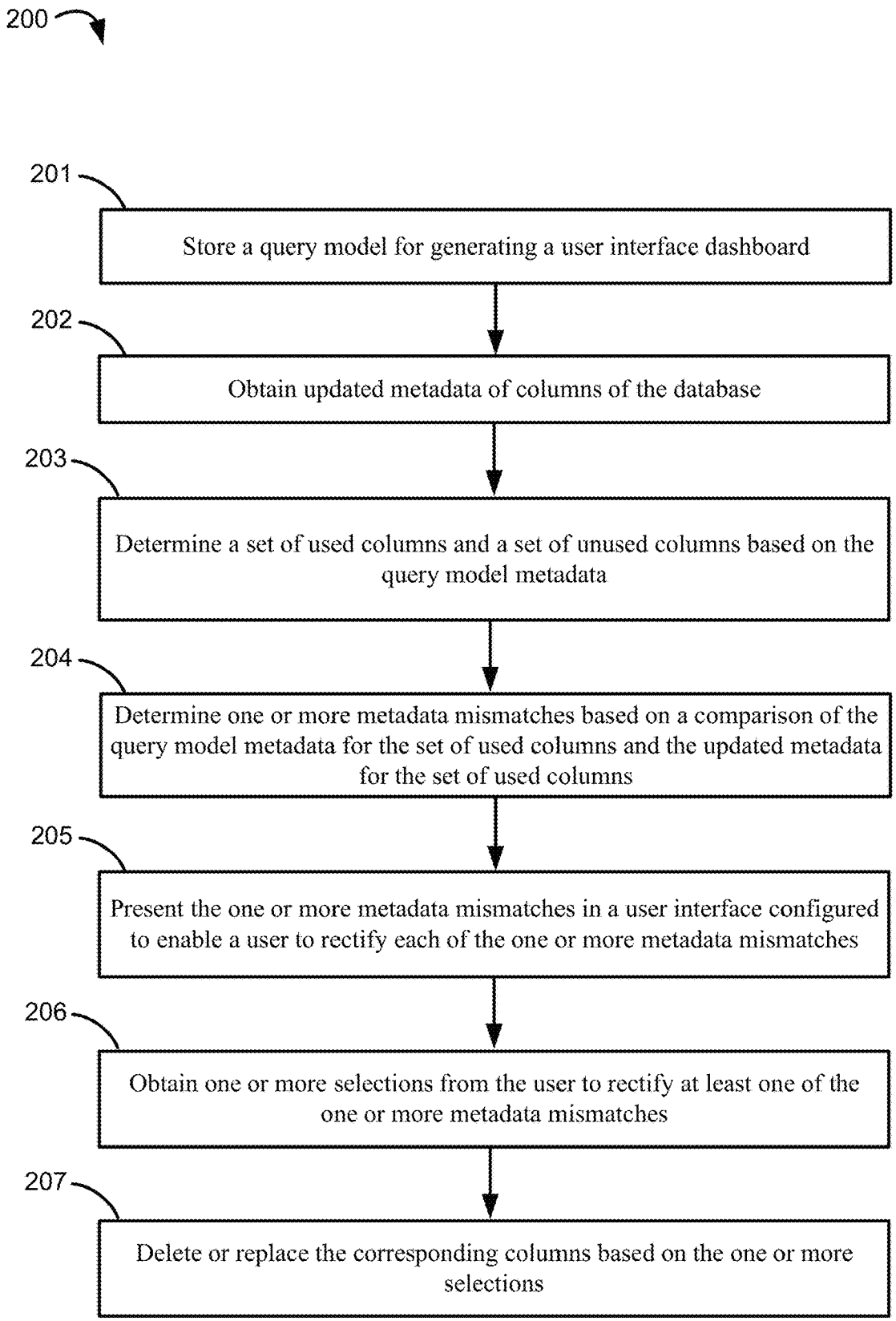
FIG. 2 shows a flowchart of a method for a metadata update, according to an embodiment.

FIG. 2 shows a flowchart of a method for a metadata update, according to an embodiment. This method may be performed by a computer system such as the computer system described above with respect to FIG. 1. For example, the method may be performed by a cloud computing platform.

At 201 the method may store a query model for generating a user interface dashboard. The user interface dashboard may include one or more visualizations based on queries to a database having a plurality of columns. The queries may be made using query model metadata of the query model.

At 202 the method may obtain updated metadata of columns of the database. The updated metadata being different from the query model metadata;

At 203 the method may determine a set of used columns and a set of unused columns based on the query model metadata. The used columns may be used in the queries for the one or more visualization of the dashboard while the unused columns may not be used in the queries.

At 204 the method may determine one or more metadata mismatches based on a comparison of the query model metadata for the set of used columns and the updated metadata for the set of used columns. Each of the one or more metadata mismatches may correspond to a particular column of a table of the database.

At 205 the method may present the one or more metadata mismatches in a user interface configured to enable a user to rectify each of the one or more metadata mismatches. The one or more metadata mismatches may be rectified by deleting the corresponding column or replacing the corresponding column with a replacement column.

At 206 the method may obtain one or more selections from the user to rectify at least one of the one or more metadata mismatches. The one or more selections may indicate deletion or replacement of corresponding columns.

At 207 the method may delete or replace the corresponding columns based on the one or more selections, thereby rectifying the meta mismatches and enabling the visualizations to query the database without error.

Further details and examples of the metadata update techniques are given below.

Figure 3:
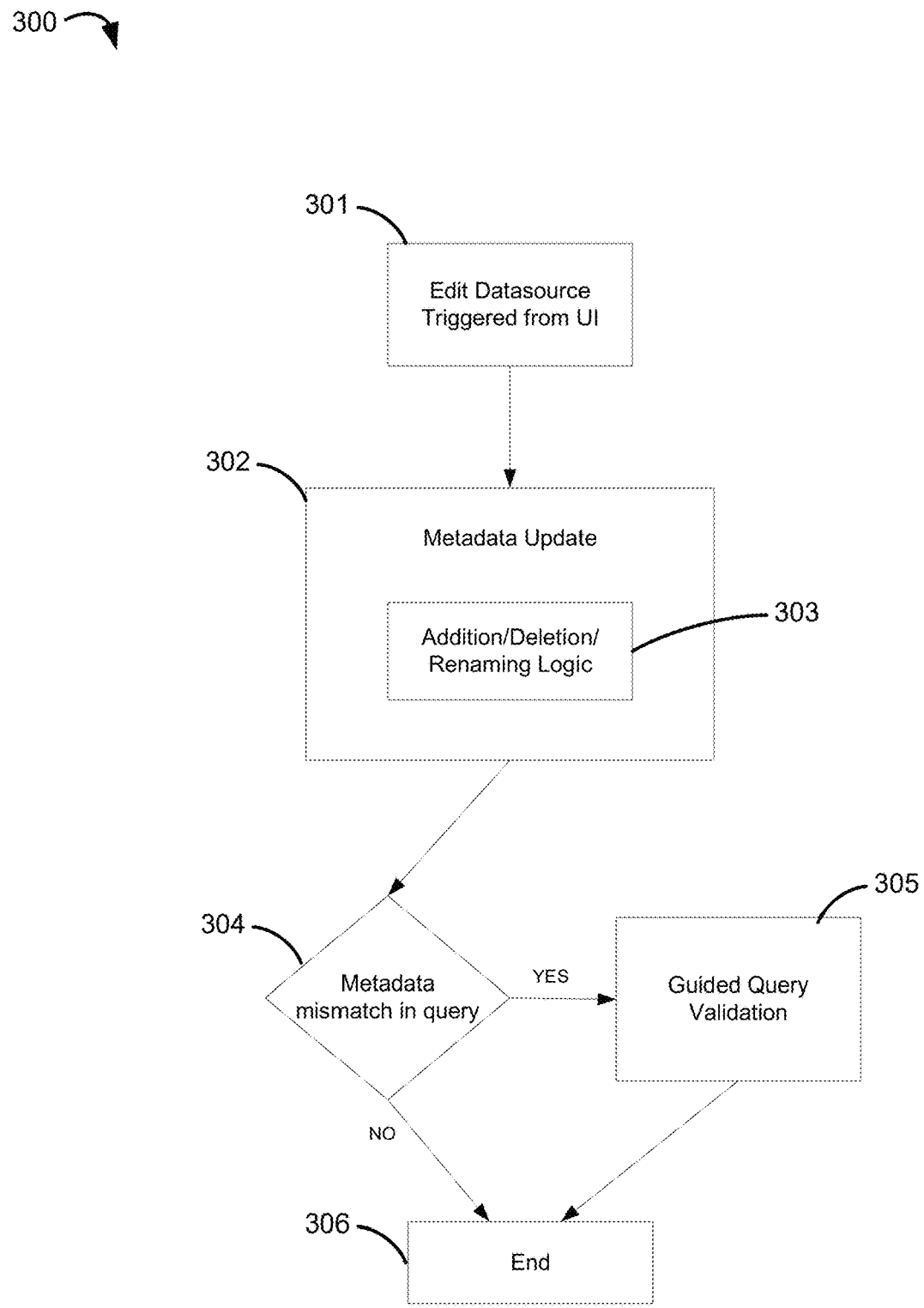
FIG. 3 shows a flowchart for performing a metadata update and guided query validation, according to an embodiment.

FIG. 3 shows a flowchart 300 for performing a metadata update 302 and guided query validation 305, according to an embodiment. The metadata update may be performed when an "edit datasource" function is triggered from the user interface, for example. The metadata update function includes addition/deletion/renaming logic 303. After the metadata update, it is determined at 304 whether there is a metadata mismatch in the query. For example, columns that are unused in the visualizations may have been automatically updated while columns that are used in the visualizations may not be updated automatically. If not, the process ends 306. For example, none of the columns used by the visualizations may have been updated or changed. If there is a mismatch, guided query validation 305 is performed. Guided query validation 305 enables the user to rectify the mismatches for columns that are used by the visualizations. These steps are described in further detail below.

Figure 4:
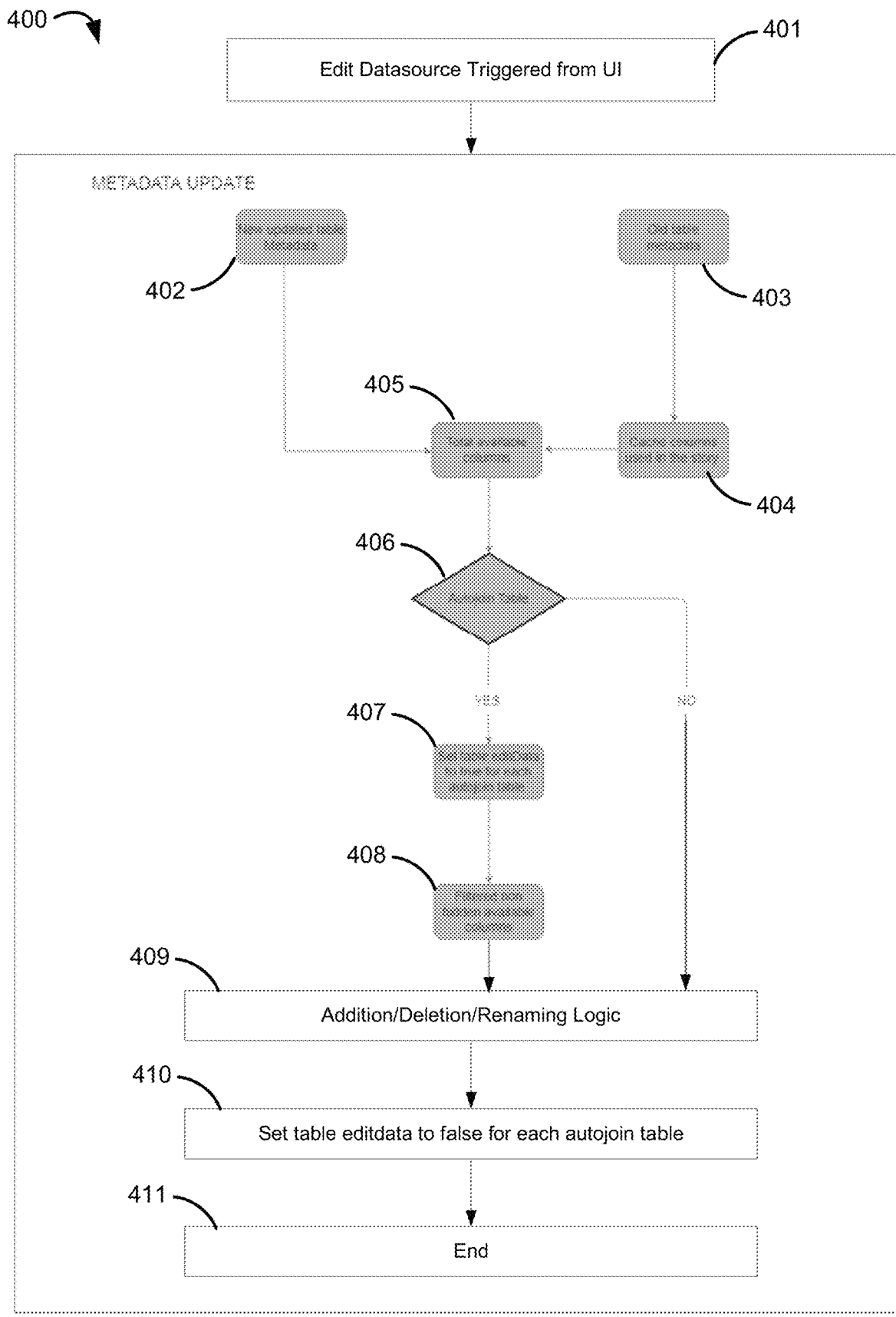
FIG. 4 shows a flowchart for performing metadata updates, according to an embodiment.

FIG. 4 shows a flowchart 400 for performing metadata updates, according to an embodiment. The metadata update in this diagram corresponds to the metadata update 302 in FIG. 3. The metadata update may be initiated at 401 upon an "edit datasource" function being triggered in the user interface 401. The new updated table metadata 402 and old table metadata 403, which is cached 404 in columns used in the story, comprise the total available columns 405. The process determines at 406 whether a table of a column is not an autojoin table or not. If not, the addition/deletion/renaming logic 409 is performed. This is described in further detail below. If the column is an autojoin table then at 407 the process sets the table editData to true for each autojoin table and at 408 filtered non-hidden available columns before performing the addition/deletion/renaming logic 409. After that logic 409 is performed, at 410 the process sets table editData to false for each autojoin table. At 411 the process ends.

Figure 5:
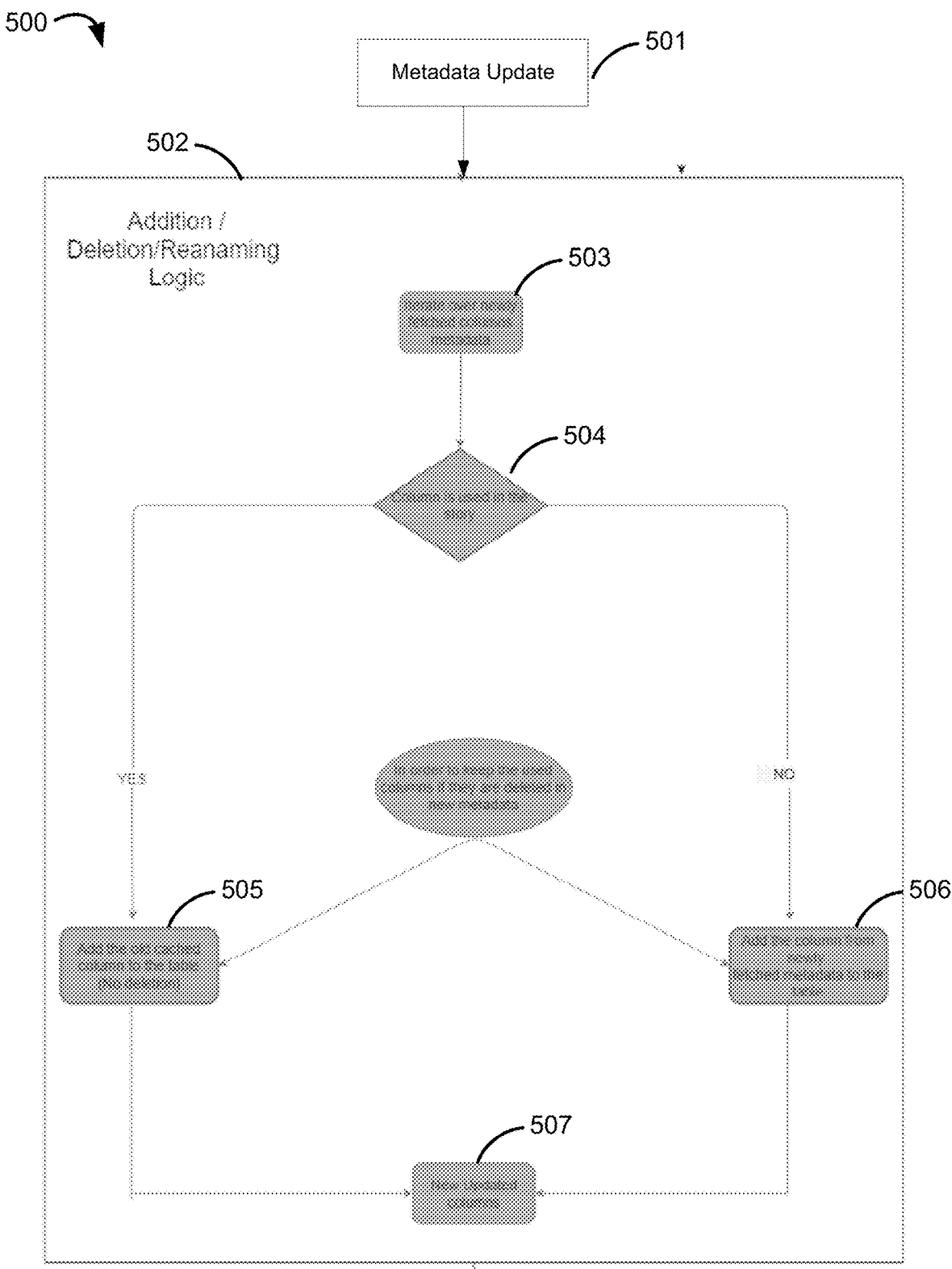
FIG. 5 shows a flowchart of addition, deletion, and renaming logic according to an embodiment.

FIG. 5 shows a flowchart 500 of addition, deletion, and renaming logic 502 according to an embodiment. This diagram corresponds to the addition/deletion/renaming logic 303 in FIG. 3. As discussed above with respect to FIG. 4, initiating the metadata update process 501 leads to the addition/deletion/renaming logic 502. The logic 502 includes iterating, at 503, over newly fetched columns metadata. At 504 it is determined whether a particular column is used in the visualization (which may be called a "story" or "report") or not. If the column is used in the visualization, at 505 add the old caches column to the table (no deletion). If the column is not used in the story, at 506 add the column from the newly fetched metadata to the table. These comprise the newly updated columns 507.

Figure 6:
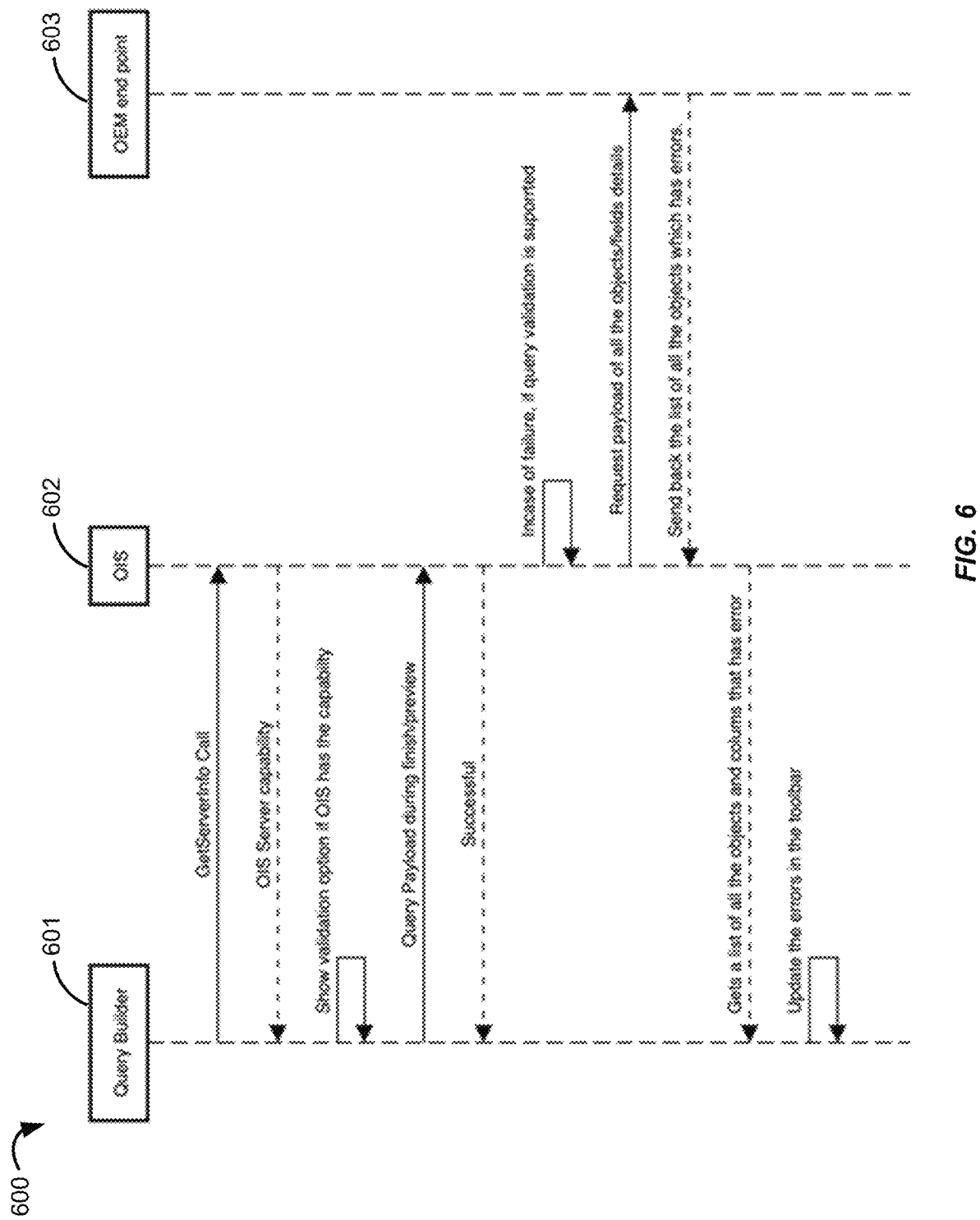
FIG. 6 shows a diagram of guided query validation, according to an embodiment.

FIG. 6 shows a diagram 600 of guided query validation, according to an embodiment. This diagram corresponds to the guided query validation 305 of FIG. 3. The guided query validation is performed between a query builder 601, an OIS component 602, and an OEM end point 603. The query builder sends a SetServerInfo Call to OIS. OIS responds with the OIS server capability. The query builder shows validation option is OIS has the capability. Then the query builder sends a Query Payload to OIS during finish/previous. OIS responds if successful. In the case of a failure, if query validation is supported, it requests payload of all the objects/fields details from the OEM endpoint, which sends back the list of all the objects which have errors. The list is sent back to the query builder, which updates the errors in the toolbar.

The metadata update process is now described with respect to example user interfaces shown in FIG. 7-14.

As discussed above, there are two cases. In one case the story metadata update is for columns that are unused in the visualization dashboard (e.g., "story"). In another cases the columns are used in the visualization dashboard. For the case of story metadata update for unused columns, this covers the scenario of how we handle showing the latest updated database artifacts metadata in the story visualizations even when the story is not broken. For the new stories, it would always be easy to get the latest metadata and show it in the UI as there are no models that have been built yet. But when it comes to updating the existing stories, we would need to update the database artifacts details in the models as well as where the stories are being consumed in the model as well. Having old metadata being shown based on old database artifacts would cause query failures if the user tries to update the query by selecting the old artifacts.

Figure 7:
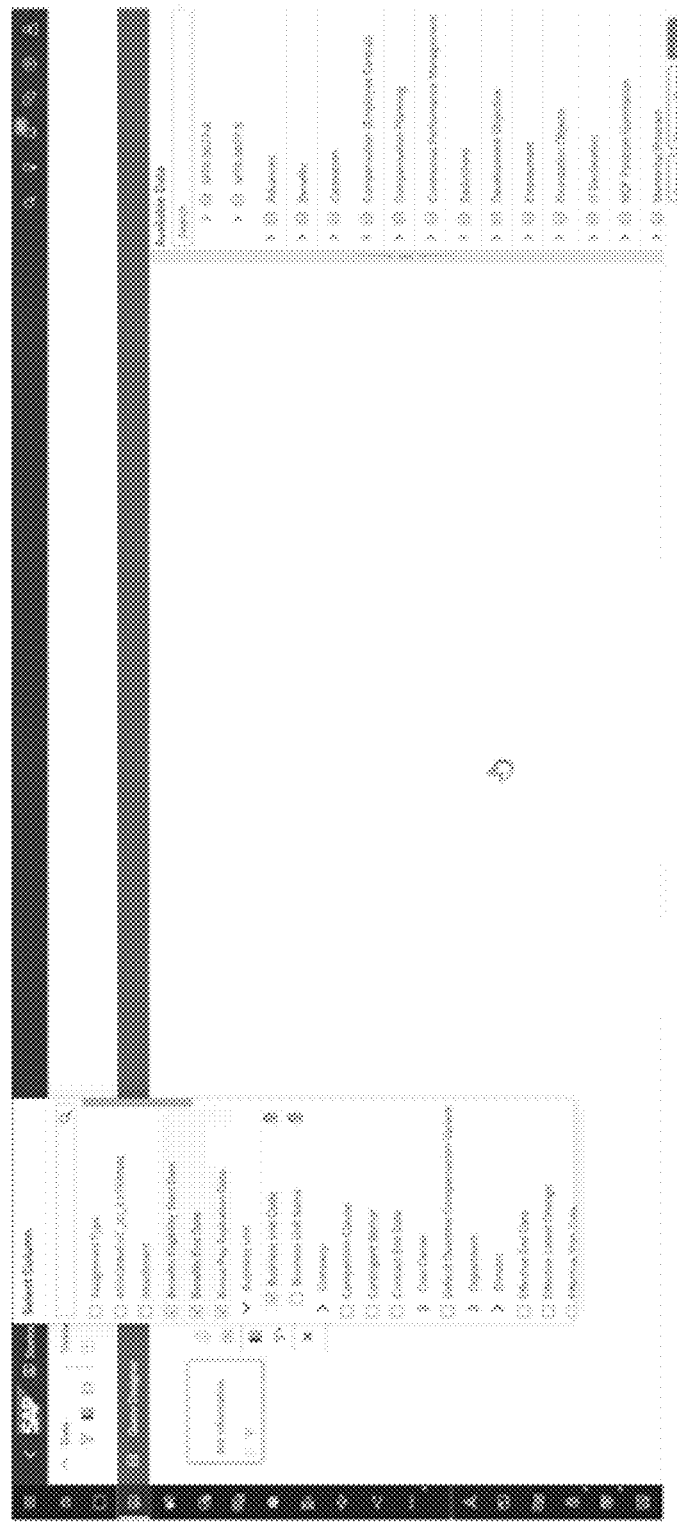
FIG. 7 illustrates a user interface showing metadata that is used in a visualization dashboard, according to an embodiment.

FIG. 7 illustrates a user interface 700 showing metadata that is used in a visualization dashboard, according to an embodiment. In this example, the columns selected for the visualization dashboard include "Benefits Eligibility Start Date," "Benefits End Date," "Bonus Pay Expiration Date," and "Business Unit Code." The column "Business Unit Code" is listed under "Business Unit."

The user interface 700 also shows "Business Unit", "Company", "Cost Center," "Department," and "Division" are autojoin tables. This means that along with columns coming from "Job Information" there are additional columns from these autojoins that the user can select.

In this case, the objectives of metadata updates are to do a one-to-one comparison and to update the columns under the autojoin tables on an on-demand basis. For the one-to-one comparison, the comparison with the old metadata and new metadata using the field ID. This helps in identifying and adding only the relevant columns that are unused in the query. Updating the used columns may be skipped as it may be handled using the query validation tool.

For the updating of the columns under the auto join tables, this may done on an on-demand basis using a lazy loading mechanism and these columns may be updated across all the areas of the query builder tool. The reason or the lazy loading mechanism is that a given table can contain multiple autojoin columns, hence doing a metadata update all at once will cause a performance issue. Instead, the system retrieves the updated metadata only when the auto joins are expanded (e.g., when the user selects the chevron next to the name to expand within the user interface).

Figure 8:
FIG. 8 illustrates a user interface showing the visualization dashboard, according to an embodiment.

FIG. 8 illustrates a user interface 800 showing the visualization dashboard, according to an embodiment. In this example, the visualization shows "Count per Benefits Eligibility Start Date, Benefits End Date, and others" based on the selections shown in FIG. 7. The user interface 800 also shows an "Edit" button which may allow the user to perform the "edit datasource" function discussed herein.

In one example, the metadata update may include deleted columns, such as "Column Name" in the "Job information" table and the "Business unit name" column in the "Business unit" table. In this situation, delete some existing unused columns, add some new column or rename some existing column from the table metadata as part of this implementation. Here the deletion of column is documented as part of metadata update.

Figure 9:
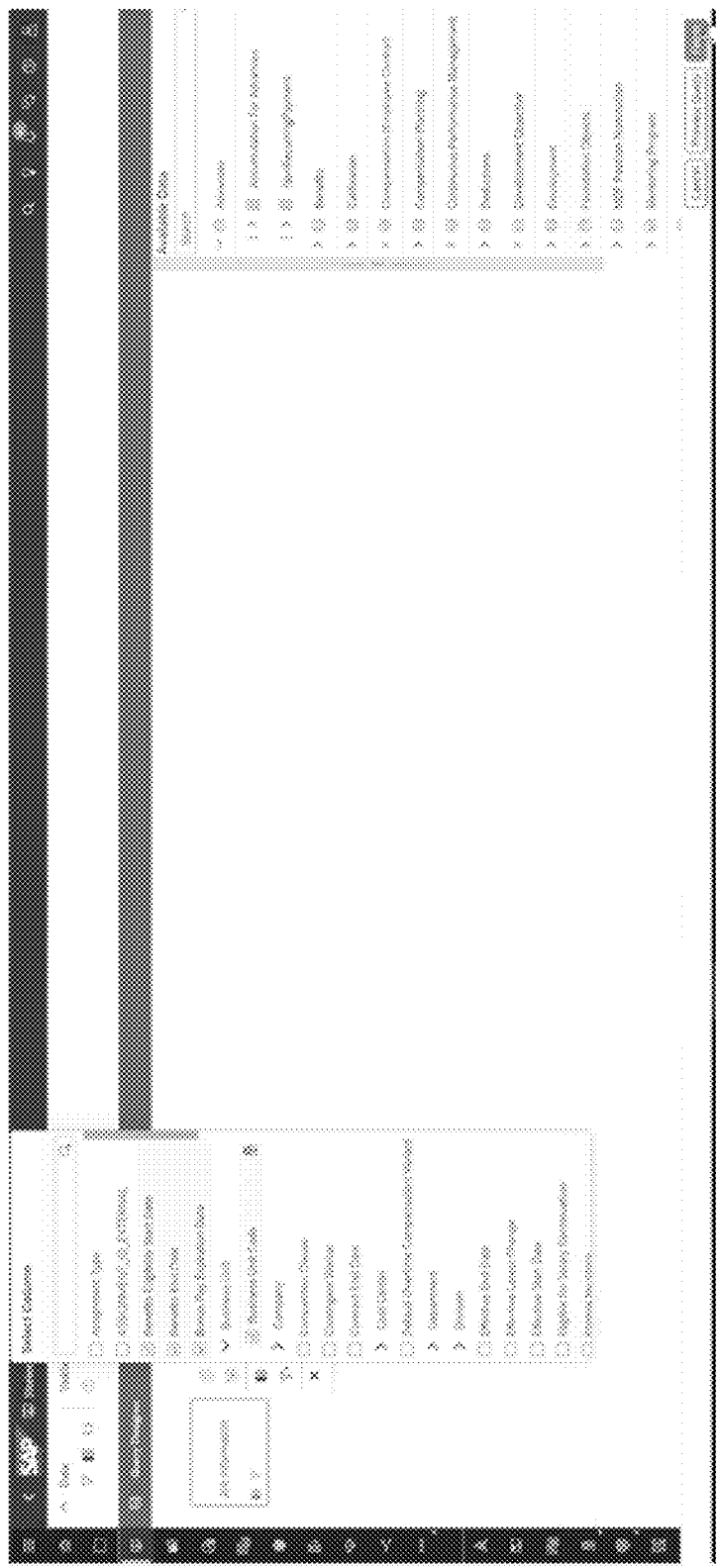
FIG. 9 illustrates a user interface showing updated metadata, according to an embodiment.

FIG. 9 illustrates a user interface 900 showing updated metadata, according to an embodiment. This shows the query builder after triggering the edit data source from the story, and expand the table from the querybuilder page to check the updated table metadata. In this example "Attachment" column and the "Business Unit Name" under "Business Unit," which were shown in the user interface 700 of FIG. 7, has been removed from the list of columns shown in this user interface 900. These columns were not selected to be used in the visualizations as shown in FIG. 7. The "Attachment" column and the "Business Unit Name" column may be automatically deleted without input from the user as the column was not used in the visualizations.

Figure 10:
FIG. 10 illustrates a user interface showing old metadata, according to an embodiment.

FIG. 10 illustrates a user interface 1000 showing old metadata, according to an embodiment. The "attachment" column and the "Business Unit Name" columns highlighted here were the old columns and have been deleted as shown in FIG. 9.

Returning now to the case where the metadata is used in the visualization dashboard, the solution for this case is described. In some cases, query execution in the databases is sequential which means that if there is an error scenario that is hit. This means that if there are ten database-related errors then the user has to fix them one by one by doing query workflow ten times, as all the information is not available in one go. The end-user may know what column needs correction and replacement and they can be given the flexibility to replace the column and update it in other places that these columns are being used.

For a visualization dashboard (e.g., "story" or "report") where the models are inconsistent with the database, the story is termed as broken as discussed herein. The objectives of the Guided Query Validation Tool are to help the user easily determine the mismatch between the story model and the metadata in the database; view the list of error in a detailed format so that is easy for the end-user to rectify the same issue from their end; remove the columns which are not used anymore and are not required; replace those columns in the story model with other column which has similar type and value using the edit/delete functionality that the tool provides; and save the dashboard/story once all these errors are resolved with the help of the guided query visualization tool.

The guided query visualization may involve the steps shown in FIG. 6 and discussed above. Guided query validation enables the user to validate and rectify any metadata mismatches. Referring to the process shown in FIG. 6, information of all the selected fields is passed to the OEM endpoint, and the OEM respond with a validation handler, which will contain the information for unavailable fields, datasources, invalid filters, joins etc. An example of the information provided by the OEM is given below:

```
{
    "validationDetails": {
        "validation": {
            "objects": [
                {
                    "id": "rd1",
                    "viewtype": "DATA_BASE_TABLE",
                    "schemaName": "ORCA_QB_TEST",
                    "packageName": "",
                    "objectName": "EFASHION_DEMO4",
                    "dataCategory": "NONE",
```

-continued

```
"fieldDetails": {
    "fields": [
        {
            "id": "Category",
            "description": "Category1",
            "validationInfos": [
                {
                    "status": "UNAVAILABLE"
                }
            ]
        },
        {
            "id": "Lines",
            "description": "Lines1",
            "validationInfos": [
                {
                    "status": "UNAVAILABLE"
                }
            ]
        }
    ]
},
{
    "id": "rd2",
    "viewtype": "DATA_BASE_TABLE",
    "schemaName": "ORCA_QB_TEST",
    "packageName": "",
    "objectName": "BESTRUN_QV4",
    "dataCategory": "NONE",
    "fieldDetails": {
        "fields": [
            {
                "id": "Category",
                "description": "Category",
                "validationInfos": [
                    {
                        "status": "UNAVAILABLE"
                    }
                ]
            },
            {
                "id": "Lines",
                "description": "Lines1",
                "validationInfos": [
                    {
                        "status": "UNAVAILABLE"
                    }
                ]
            },
            {
                "id": "Manager",
                "description": "Manager"
            }
        ]
    }
}
```

The above information may be retrieved using a validation API, {host}/v1/handleValidation where the host points to the server which is used for retrieving the metadata, for example. In the above response information, some of the columns are indicated as being unavailable. If these columns are used in a filter applied to queries of the visualizations, then that information will also be shown in the query guided tool for the user to valid. On deleting/replacing the column with the guided query validation tool, the tool will also fix the filter as well (deleting or replacing the column). This same fix will be performed in the case of joins, local advanced filters, scope filters, etc.

Figure 11:
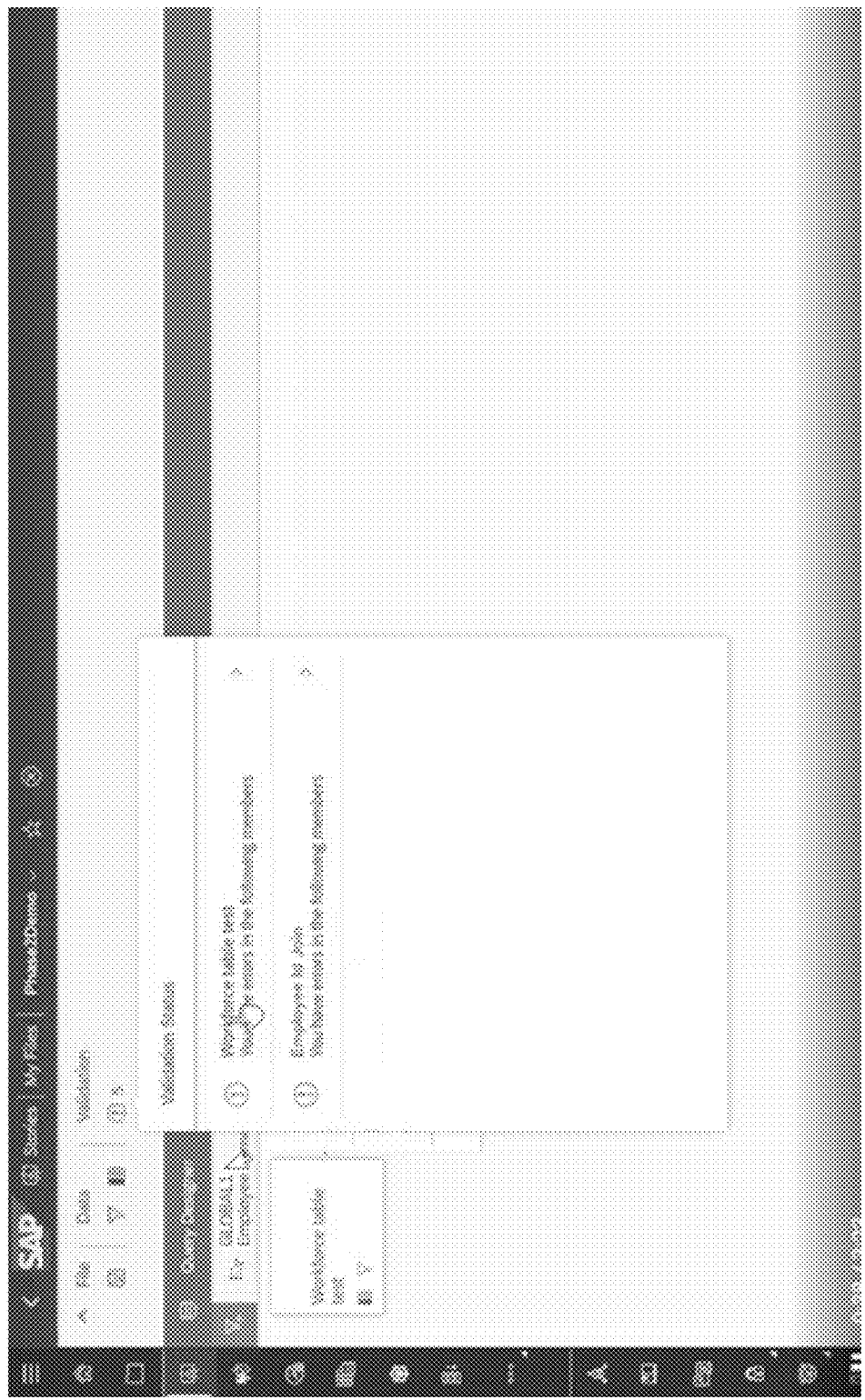
FIG. 11 illustrates a user interface showing validation status, according to an embodiment.

FIG. 11 illustrates a user interface 1100 showing validation status, according to an embodiment. This is an example user interface for the guided query validation tool. As shown in the user interface 100, there are errors in "Workforce table test" and "Employee ID join." This UI is where it is shown the detailed view of all the errors, this list is based on the response of the validation API of the OEM discussed above.

Figure 12:
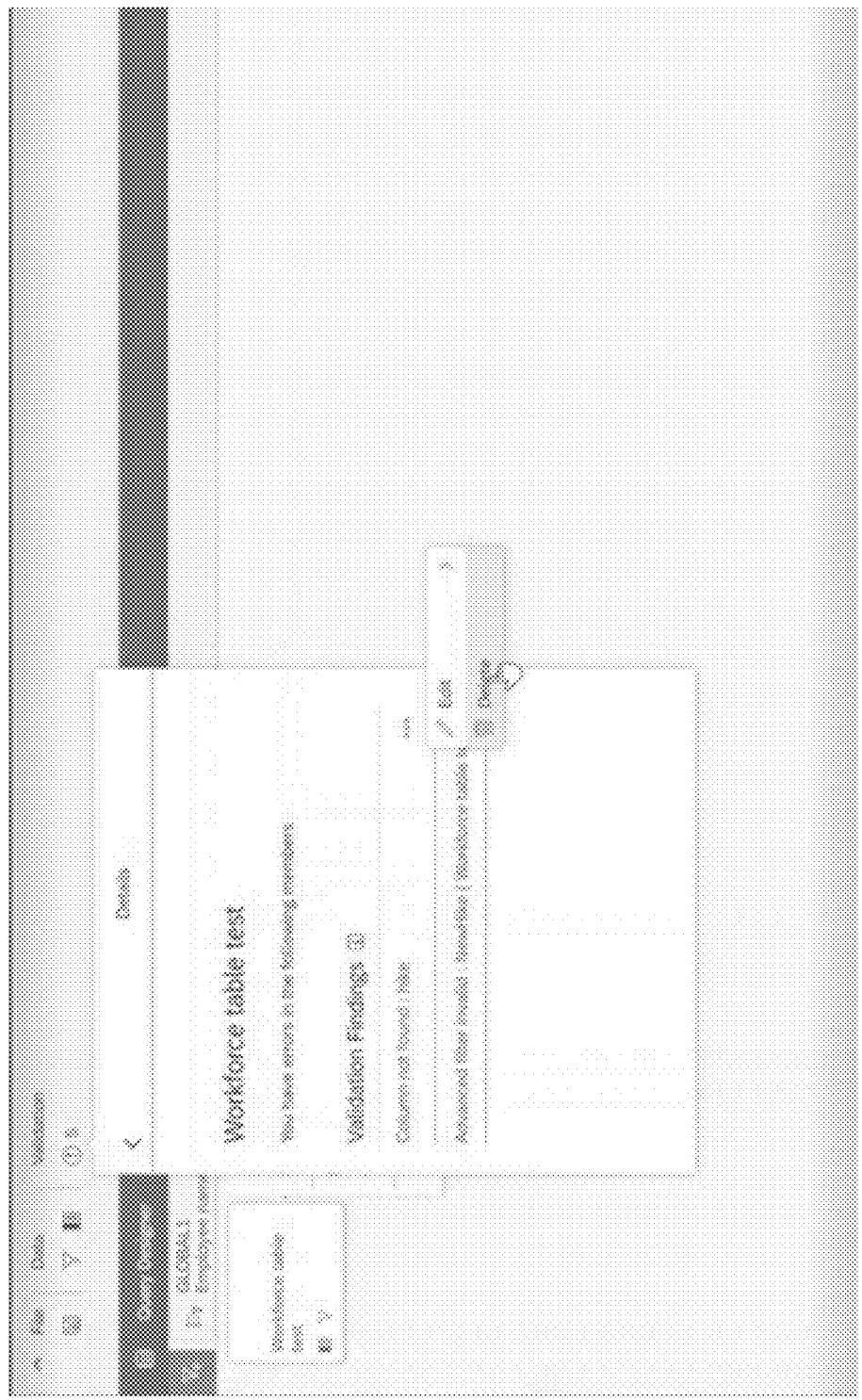
FIG. 12 illustrates a user interface showing a list of errors, according to an embodiment.

FIG. 12 illustrates a user interface 1200 showing a list of errors, according to an embodiment. When the user clicks on one of the rows in the Validation Status view, the user is taken to the detailed view where they can see the anomalies related to a specific datasource. As shown, the user sees one of the columns used in the story in "Not found". And also there seems to be an issue with the advanced filter "NewHike." Here, the user can edit/delete the column which is not found and replace it with any of the working fields in the specific table. Also, they can inspect the advanced filter after the used fields are rectified and change it accordingly from the filter dialog as per their requirement.

In one example, the columns hike, Employee ID, Job Title, and Rating are available for selection from the table. In this example, the column hike is selected and other fields are not selected. Now given a situation where we see that 'hike' is deleted from db. In that case we will see the message Column not found: hike in the validation details section, with the option of edit/delete available on the column 'hike.'

Figure 13:
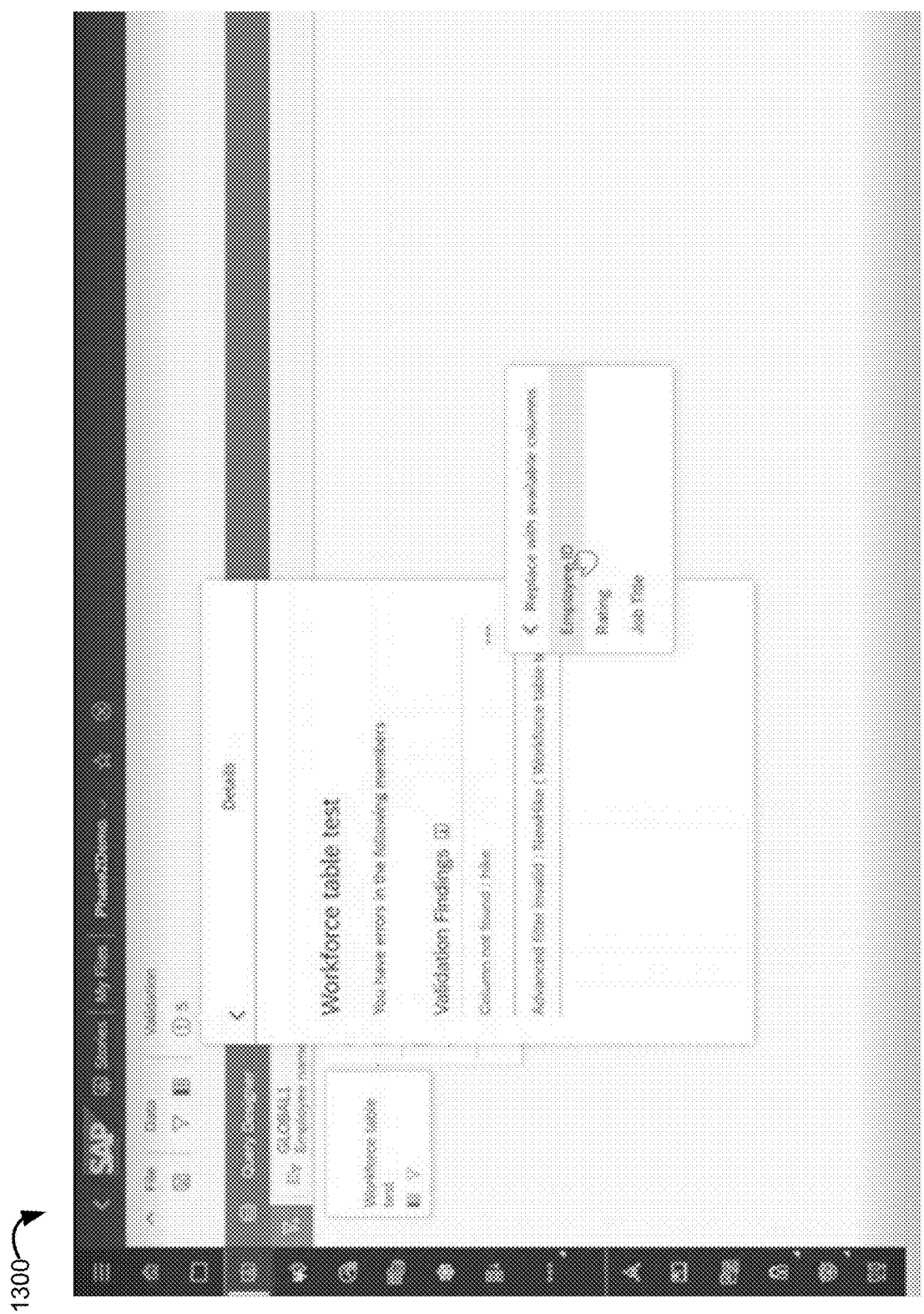
FIG. 13 illustrates a user interface showing a menu for rectifying an error, according to an embodiment.

FIG. 13 illustrates a user interface 1300 showing a menu for rectifying an error, according to an embodiment. In this example, the User replaces hike with Employee ID, thereby rectifying the metadata mismatch.

Figure 14:
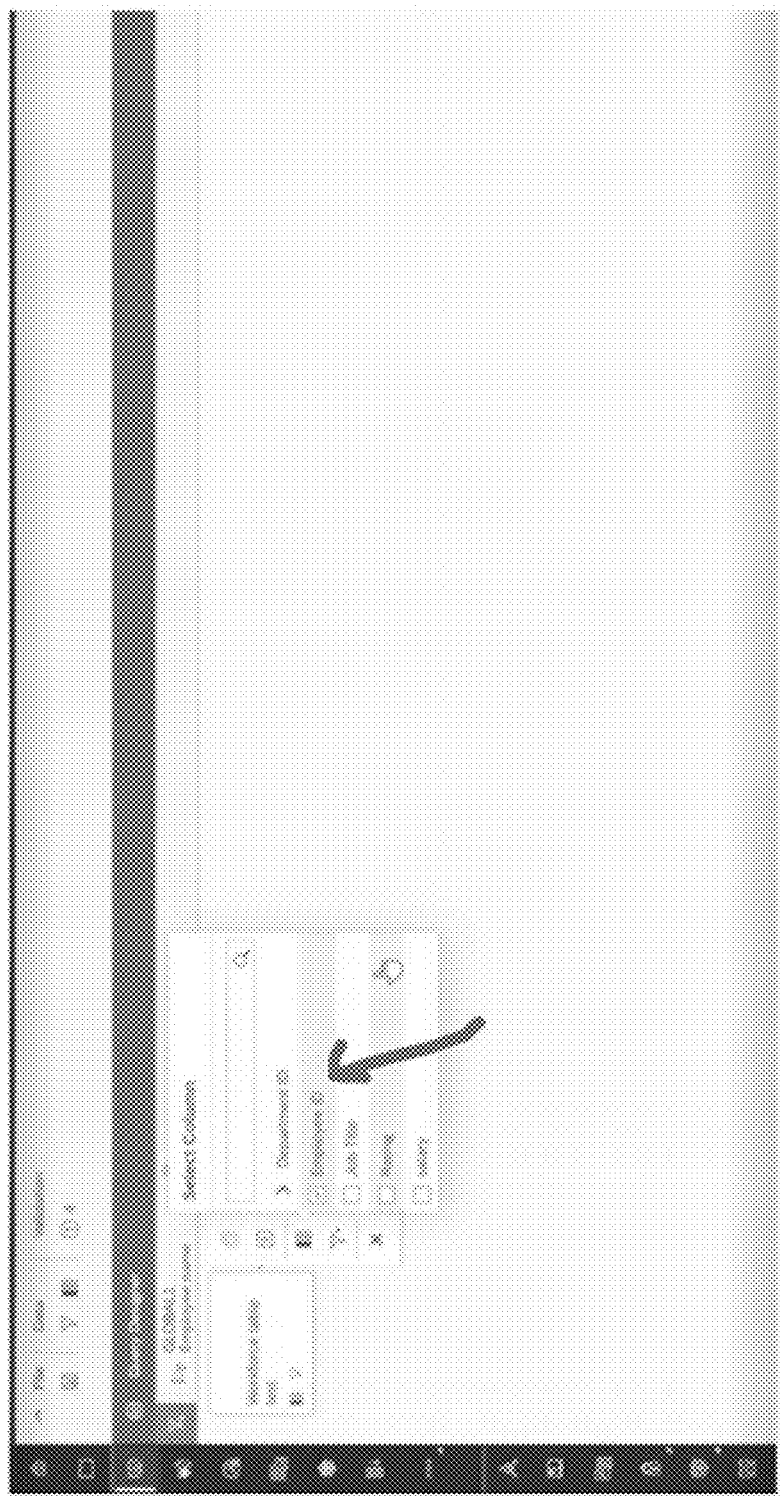
FIG. 14 illustrates a user interface showing a menu for deleting a column, according to an embodiment.

FIG. 14 illustrates a user interface 1400 showing the replacement column, according to an embodiment. In the selected column now we see that Employee ID is selected and hike is automatically removed and deselected from the selected fields.

In the delete workflow, if user chooses to delete hike, it will be removed similarly from the list of available columns but the Employee ID field would not be selected.

Referring back to the process shown in FIG. 6, the below structure may be passed to the OEM end points, as an example. This structure contains the list of joins, fields, objects that are being used in the query.

```
"validationErrors": {
    "validationDetails": {
        "validation": {
            "objects": [ ... ],
            "filters": [ ],
            "calculatedFields": [ ],
            "joins": [
                {
                    "fieldDetails": {
                        "fields": [
                            {
                                "id": "person#personalInfo#PERSON_ID",
                                "description": "Person ID",
                                "schemaName": "",
                                "packageName": "STEAMEAIRH_SAC/person",
                                "viewType": "CALCULATION_VIEW",
                                "objectName": "oTable.tableTechnicalNam",
                                "ObjectId": "rd1",
                                "validationInfos": [ ]
                            },
                            {
                                "id":
                                "Employment#employmentInfo#PERSON_ID",
                                "description": "PERSON_ID",
                                "schemaName": "",
                                "packageName":
                                "STEAMEAIRH_SAC/Employment",
```

```
            "viewType": "CALCULATION_VIEW",
            "objectName": "oTable.tableTechnicalNam",
            "ObjectId": "rd2",
            "validationInfos": [ ]
          }
        ]
      }
    },
    {
      "fieldDetails": {
        "fields": [
          {
            "id": "person#personalInfo#NATIONALITY",
            "description": "Country of Citizenship",
            "schemaName": "",
            "packageName": "STEAMEAIRH_SAC/person",
            "viewType": "CALCULATION_VIEW",
            "objectName": "oTable.tableTechnicalNam",
            "ObjectId": "rd1",
            "validationInfos": [ ]
          },
```

An example of the request that is passed for the field details is given below:

```
"validationDetails": {
  "validation": {
    "objects": [
      { ...
      },
      {
        "id": "rd2",
        "schemaName": "",
        "packageName": "STEAMEAIRH_SAC/Employment",
        "objectName": oTable.tableTechnicalNam",
        "viewType": "CALCULATION_VIEW",
        "fieldDetails": {
          "fields": [
            {
              "id": "Employment#employmentInfo#3_CUSTOM_DATE2",
              "description": "Assignment End Date",
              "validationInfos": [ ]
            },
            {
              "id": "Employment#employmentInfo#ASSIGNMENT_TYPE",
              "description": "Assignment Type",
              "validationInfos": [ ]
            }
          ]
        },
        "filterDetails": {
          "fields": [
            {
              "id": "Employment#employmentInfo#IS_EC_OF_RECORD",
              "description": "Is Employee Central System of Record",
              "validationInfos": [ ]
            },
            {
              "id": "Employment#employmentInfo#J_EFFECTIVE_LATEST_CHANGE",
              "description": "Effective Latest Change",
              "validationInfos": [ ]
            }
          ]
        },
        "leveledHierarchies": {
          "fields": [ ]
```

An example of a request being passed for object details is given below:

```
"errorMessage": {
  "exceptionErrors": "'Column does nto exist in calculation View'
person#personalInfo#NATIONALITY STEAMEAIRH_SAC.person
```

```
oTable.tableTechnicalNam",
    "validationErrors": {
      "validationDetails": {
        "validation": {
          "objects": [ ...
          ],
          "filters": [ ],
          "calculatedFields": [ ],
          "joins": [ ...
          ],
          "inputParameters": [
            {
              "fieldDetails": {
                "fields": [
                  {
                    "description": "As of Date for Personal Information, Job Information, Country/Region",
                    "validationInfos": [ ]
                  }
                ]
              }
            }
          ]
        },
```

```
    "error": P{
    }
  }
}
```

All of the different filters, joins, inputParameters, objects information and the associated validationInfos details sent by OEM may then be parsed to create a validation objects JSON, for example, which contain the required information to display in the UI. The following is sample code to parse through the "objects" in the validation error and add those to our validation object which have the "validationInfos" property attached:

```
} else {
    //Iteration over datasources other than "objects".
    For (const [fieldKey, fieldValue] of Object.entries(obj)) {
        if(fieldKey !== "validationInfos" && fieldValue.fields && fieldValue.fields.length > 0) {
            fieldValue.fields.forEach((field) => {
                datasourceId = field.objectId;
                if (datasourceIdDescriptionMap.has(field.objectId)) {
                    dataSourceValue =
                    datasourceIdDescriptionMap.get(datasourceId);
                }
                if (field.validationInfos.length > 0{
                    let (tempObj = {
                        "id": field.id,
                        "description": field.description,
                        "validationInfos": field.validationInfos
                    };
                    dataSourceValue.fields.add(tempObj);
                }
            });
        }
}
```

In case there is any "validationInfos" with status as unavailable then it also increases the validation counter also by 1.

For any property like objects, joins, filter which are listed in the validation error, if validationInfos' status property is unavailable, we use the description property to display the same in the validation tool UI. An example of the description property is given below:

```
key: "rd4"
▼ value:
    description: "Currency"
    ▼ fields: Array(1)
        ▶ 0: {id: "FoundationObjects#Currency#internalId",
            description: "internalId", vali
            length: 1
        ▶ _proto_: Array(0)
            objectName: "oTable.tableTechnicalNam"
```

Features and advantages of the metadata update process and guided query validation tool described herein include enabling an end user, who may have little or no technical knowledge of the database or the above workflows, to update the visualization dashboard/stories/reports which are broken and rectify the metadata mismatches to enable the queries and visualizations to work properly. This utility allows the end user to quickly rectify the reports at their end without the need to involve technical help and also allows them to check if the metadata at their end is missing or not updated.

EXAMPLE HARDWARE

Figure 15:
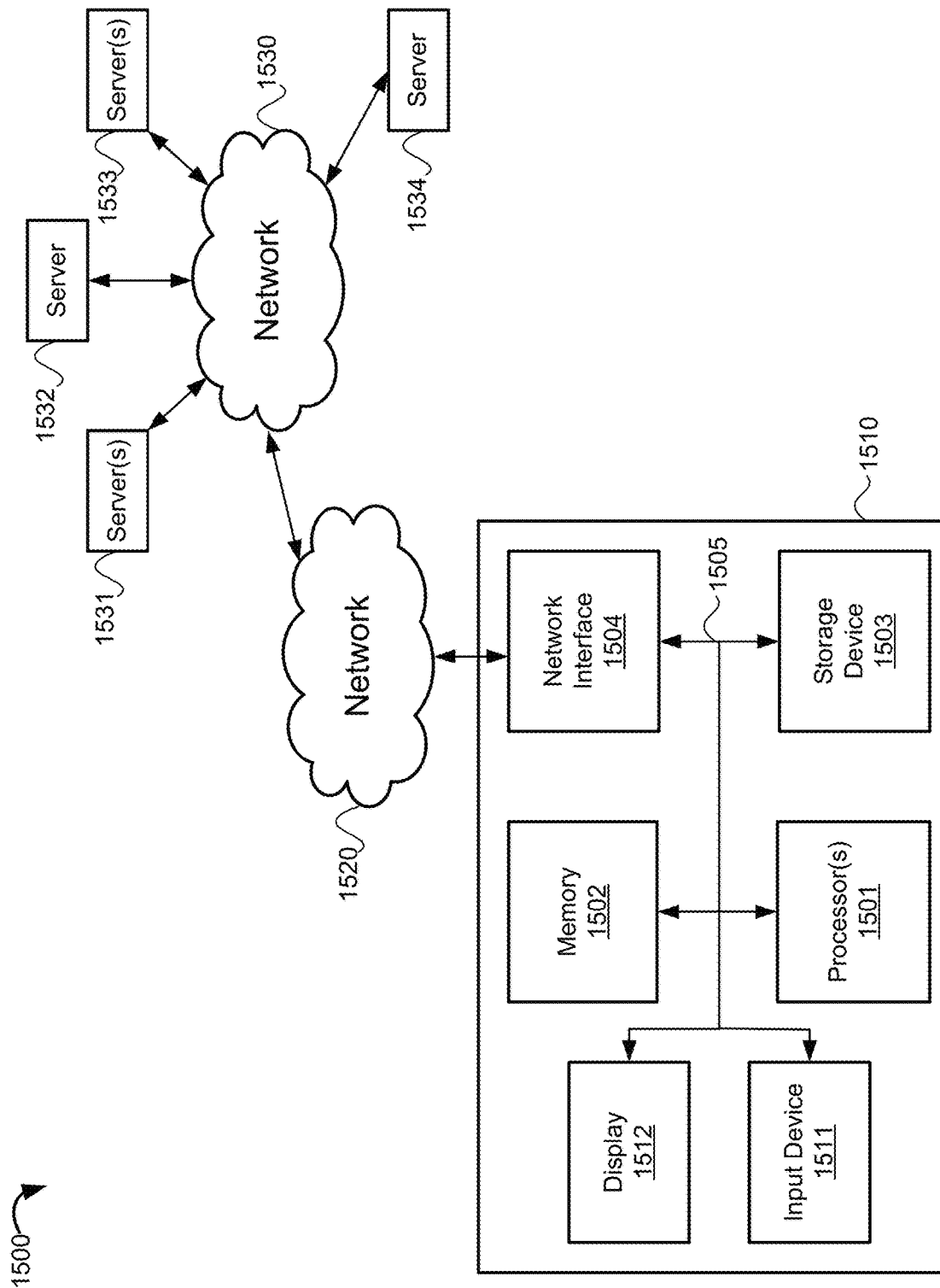
FIG. 15 shows a diagram of hardware of a special purpose computing machine for implementing systems and methods described herein.

FIG. 15 shows a diagram 1500 of hardware of a special purpose computing machine for implementing systems and methods described herein. The following hardware description is merely one example. It is to be understood that a variety of computers topologies may be used to implement the above described techniques. The hardware shown in FIG. 15 may be used to implement the computer systems and computer software (computer program code) described herein.

The computer system 1510 includes a bus 1505 or other communication mechanism for communicating information, and one or more processor(s) 1501 coupled with bus 1505 for processing information. The computer system 1510 also includes a memory 1502 coupled to bus 1505 for storing information and instructions to be executed by processor 1501, including information and instructions for performing some of the techniques described above, for example. This memory may also be used for storing programs executed by processor(s) 1501. Possible implementations of this memory may be, but are not limited to, random access memory (RAM), read only memory (ROM), or both. A storage device 1503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 1503 may include source code, binary code, or software files for performing the techniques above, for example. Storage device and memory are both examples of non-transitory computer readable storage mediums.

The computer system 1510 may be coupled via bus 1505 to a display 1512 for displaying information to a computer user. An input device 1511 such as a keyboard, touchscreen, and/or mouse is coupled to bus 1505 for communicating information and command selections from the user to processor 1501. The combination of these components allows the user to communicate with the system. In some systems, bus 1505 represents multiple specialized buses, for example.

The computer system also includes a network interface 1504 coupled with bus 1505. The network interface 1504 may provide two-way data communication between computer system 1510 and a network 1520. The network interface 1504 may be a wireless or wired connection, for example. The network 1520 may be a local area network or an intranet, for example. The computer system 1510 can send and receive information through the network interface 1504, across the network 1520, to computer systems connected to the Internet 1530. Using the Internet 1530 the computer system 1510 may access data and features that reside on multiple different hardware servers 1531-1534. The servers 1531-1534 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   a storage device; and
   one or more machine-readable media coupled to the one or more processors and storing computer program code that, upon being executed by the one or more processors, causes the one or more processors to:

generate a first user interface of a data visualization application that displays one or more data visualizations, the one more data visualizations including data that is retrieved by the computer system from a database running on a second computer system via one or more queries, the one or more queries being based on query model metadata that identifies one or more columns in the database and is part of a query model that is stored in the storage device of the computer system;

present the first user interface to a user of the data visualization application;

obtain, from the database, updated metadata of columns of the database, the updated metadata being different from the query model metadata;

determine a set of used columns and a set of unused columns based on the query model metadata, the set of used columns being used by the one or more queries for the one or more data visualizations of the first user interface, the set of unused columns not being used by the one or more queries;

determine one or more metadata mismatches based on a comparison of the query model metadata for the set of used columns and the updated metadata for the set of used columns, wherein each of the one or more metadata mismatches corresponds to a particular column of a table of the database, and wherein the one or more metadata mismatches prevent the one or more data visualizations from being correctly displayed in the first user interface;

generate one or more second user interfaces of the data visualization application that display the one or more metadata mismatches and include one or more user interface controls for rectifying the one more metadata mismatches, the one or more user interface controls including a first control for deleting the corresponding column for a metadata mismatch or a second control for replacing the corresponding column for a metadata mismatch with a replacement column;

present the one or more second user interfaces to the user;

obtain, from the user via the presented one or more second user interfaces, one or more selections pertaining to the first or second controls for rectifying at least one of the one or more metadata mismatches, the one or more selections indicating deletion or replacement of corresponding columns; and update the query model metadata for the set of used columns in the query model stored in the storage device, the updating comprising deleting or replacing the corresponding columns based on the one or more selections obtained from the user via the one or more second user interfaces.

2. The computer system of claim 1, wherein the computer program code further causes the one or more processors to:
update the query model metadata for the set of unused columns based on the updated metadata obtained from the database.

3. The computer system of claim 1, wherein the updated metadata pertains to columns of an autojoin table.

4. The computer system of claim 1, wherein the comparison of the query model metadata for the set of used columns and the updated metadata for the set of used columns uses a field identifier to determine the one or more metadata mismatches.

5. The computer system of claim 1, wherein the second control in the one or more second user interfaces provides a set of replacement columns based on the updated metadata for the user to select from.

6. The computer system of claim 1, wherein the computer program code further causes the one or more processors to:
obtain validation information for the set of used columns in response to determining the one or more metadata mismatches, the validation information identifying one or more of unavailable fields, data sources, invalid filters, and joins; and
parse the validation information to obtain status and description properties, the status and description properties being presented to the user in the one or more second user interfaces.

7. The computer system of claim 1, wherein the computer program code further causes the one or more processors to:
re-display the one or more data visualizations in the first user interface based on queries made using the updated query model metadata.

8. One or more non-transitory computer-readable media storing computer program code that, when executed by a computer system, causes the computer system to:
generate a first user interface of a data visualization application that displays one or more data visualizations, the one more data visualizations including data that is retrieved by the computer system from a database running on a second computer system via one or more queries, the one or more queries being based on query model metadata that identifies one or more columns in the database and is part of a query model that is stored in a storage device of the computer system;

present the first user interface to a user of the data visualization application;

obtain, from the database, updated metadata of columns of the database, the updated metadata being different from the query model metadata;

determine a set of used columns and a set of unused columns based on the query model metadata, the set of used columns being used the one or more queries for the one or more data visualizations of the first user interface, the set of unused columns not being used by the one or more queries;

determine, on the first computer, one or more metadata mismatches based on a comparison of the query model metadata for the set of used columns and the updated metadata for the set of used columns, wherein each of the one or more metadata mismatches corresponds to a particular column of a table of the database, and wherein the one or more metadata mismatches prevent the one or more data visualizations from being correctly displayed in the first user interface;

generate one or more second user interfaces of the data visualization application that display the one or more metadata mismatches and include one or more user interface controls for rectifying the one more metadata mismatches, the one or more user interface controls including a first control for deleting the corresponding column for a metadata mismatch or a second control for replacing the corresponding column for a metadata mismatch with a replacement column;

present the one or more second user interfaces to the user;

obtain, from the user via the presented one or more second user interfaces, one or more selections pertaining to the first or second controls for rectifying at least one of the one or more metadata mismatches, the one or more selections indicating deletion or replacement of corresponding columns; and update the query model metadata for the set of used columns in the query model stored in the storage device, the updating comprising deleting or replacing the corresponding columns based on the one or more selections obtained from the user via the one or more second user interfaces.

9. The non-transitory computer-readable medium of claim 8, wherein the computer program code further causes the computer system to:

update the query model metadata for the set of unused columns based on the updated metadata obtained from the database.

10. The non-transitory computer-readable medium of claim 8, wherein the updated metadata pertains to columns of an autojoin table.

11. The non-transitory computer-readable medium of claim 8, wherein the comparison of the query model metadata for the set of used columns and the updated metadata for the set of used columns uses a field identifier to determine the one or more metadata mismatches.

12. The non-transitory computer-readable medium of claim 8, wherein the second control in the one or more second user interfaces provides a set of replacement columns based on the updated metadata for the user to select from.

13. The non-transitory computer-readable medium of claim 8, wherein the computer program code further causes the computer system to:

obtaining validation information for the set of used columns in response to determining the one or more metadata mismatches, the validation information identifying one or more of unavailable fields, data sources, invalid filters, and joins; and parsing the validation information to obtain status and description properties, the status and description properties being presented to the user in the one or more second user interfaces.

14. The non-transitory computer-readable medium of claim 8, wherein the computer program code further causes the computer system to:

re-display the one or more data visualizations in the first user interface based on queries made using the updated query model metadata.

15. A computer implemented method performed by a computer system, comprising:

generating a first user interface of a data visualization application that displays one or more data visualizations, the one more data visualizations including data that is retrieved by the computer system from a database running on a second computer system via one or more queries, the one or more queries being based on query model metadata that identifies one or more columns in the database and is part of a query model that is stored in a storage device of the computer system;

presenting the first user interface to a user of the data visualization application;

obtaining, from the database, updated metadata of columns of the database, the updated metadata being different from the query model metadata;

determining a set of used columns and a set of unused columns based on the query model metadata, the set of used columns being used by the one or more queries for the one or more data visualizations of the first user interface, the set of unused columns not being used by the one or more queries;

determining one or more metadata mismatches based on a comparison of the query model metadata for the set of used columns and the updated metadata for the set of used columns, wherein each of the one or more metadata mismatches corresponds to a particular column of a table of the database, and wherein the one or more metadata mismatches prevent the one or more data visualizations from being correctly displayed in the first user interface;

generating one or more second user interfaces of the data visualization application that display the one or more metadata mismatches and include one or more user interface controls for rectifying the one more metadata mismatches, the one or more user interface controls including a first control for deleting the corresponding column for a metadata mismatch or a second control for replacing the corresponding column for a metadata mismatch with a replacement column;

presenting the one or more second user interfaces to the user;

obtaining, from the user via the presented one or more second user interfaces, one or more selections pertaining to the first or second controls for rectifying at least one of the one or more metadata mismatches, the one or more selections indicating deletion or replacement of corresponding columns; and update the query model metadata for the set of used columns in the query model stored in the storage device, the updating comprising deleting or replacing the corresponding columns based on the one or more selections obtained from the user via the one or more second user interfaces.

16. The method of claim 15, further comprising:

updating the query model metadata for the set of unused columns based on the updated metadata obtained from the database.

17. The method of claim 15, wherein the updated metadata pertains to columns of an autojoin table.

18. The method of claim 15, wherein the determining of the set of used columns and the set of unused columns comprises comparing the query model metadata and the updated metadata using a field identifier to identify the set of unused columns.

19. The method of claim 15, wherein the comparison of the query model metadata for the set of used columns and the updated metadata for the set of used columns uses a field identifier to determine the one or more metadata mismatches.

20. The method of claim 15, further comprising:

obtaining validation information for the set of used columns in response to determining the one or more metadata mismatches, the validation information identifying one or more of unavailable fields, data sources, invalid filters, and joins; and parsing the validation information to obtain status and description properties, the status and description properties being presented to the user in the one or more second user interfaces.

\* \* \* \* \*